Nov. 24, 1964  S. THALER  3,158,849

ELECTRONIC SELECTION CIRCUIT

Filed March 2, 1961

INVENTOR.

BY SHERWOOD THALER

Edwin E. Greigg

United States Patent Office 3,158,849
Patented Nov. 24, 1964

3,158,849
ELECTRONIC SELECTION CIRCUIT
Sherwood Thaler, Stamford, Conn., assignor to Simmonds Precision Products, Inc., Tarrytown, N.Y., a corporation of New York
Filed Mar. 2, 1961, Ser. No. 92,825
3 Claims. (Cl. 340—182)

This invention relates to electronic circuitry for determining or selecting the highest or lowest of a plurality of signals representative of any of several parameters such as temperature, pressure, vibration, etc.

An electronic selection circuit which selects the maximum or minimum signal of a plurality of transducer outputs is described and claimed in the copending application of a related invention as the present application, Serial No. 47,190, filed August 3, 1960, and now Patent No. 3,124,792, and assigned to the same assignee as the present application. In said copending application, Serial No. 47,190, the circuit provides for the selection of the maximum or minimum value of a plurality of signals. Therefore, this copending application describes a system which is somewhat related as to its application.

The present invention has as its general objects to retain the advantageous features of the system described in copending application No. 47,190, while increasing its usefulness and versatility.

According to an embodiment of the present invention, a novel electronic selection circuit of the above type is provided wherein in addition to transmitting the maximum or minimum value of a plurality of transducer outputs, the circuit indicates the signal channel which is being transmitted.

Another object of the present invention is to provide a novel electronic selection circuit with improved transmission characteristics so that no insertion loss attenuation occurs due to the selection circuitry.

The invention will be better understood after reading the following description in connection with the accompanying drawings in which.

Figure 1:
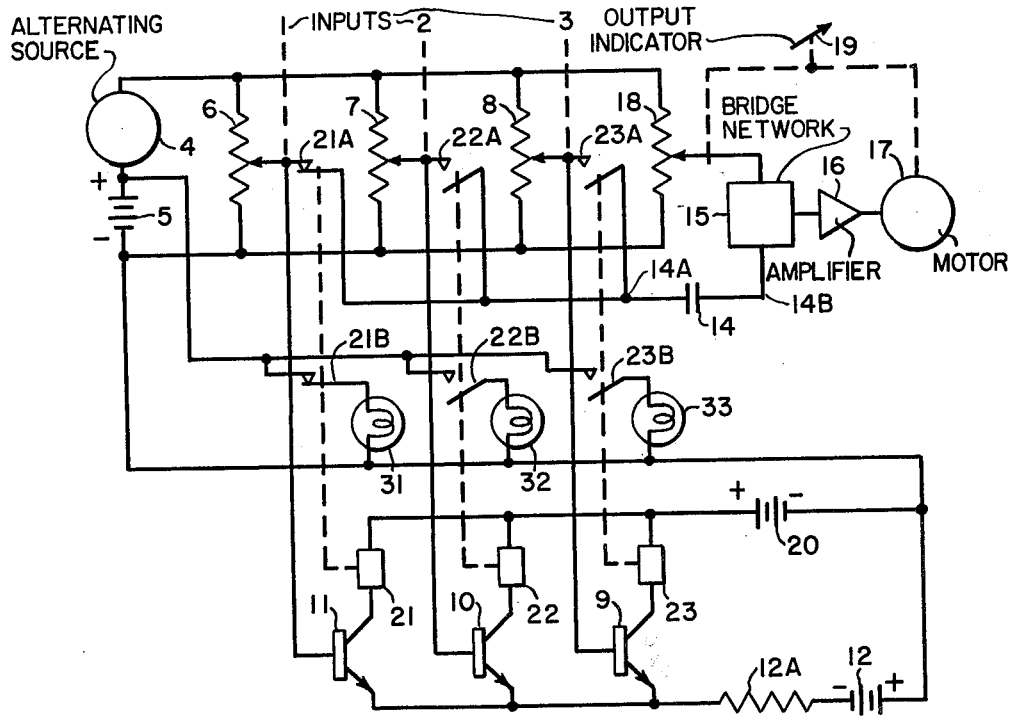
FIGURE 1 is a schematic diagram of a circuit for determining and identifying the maximum of a plurality of signals.

Referring to FIG. 1, a plurality of transducer or sensor inputs 1, 2 and 3 of transducers or sensors are shown by way of example. The sensors may be any mechanism which indicates mechanically a magnitude representative of a physical parameter by changing the resistance between two of the terminals of potentiometers 6, 7, and 8. By way of example, such sensors may be pressure transducers using potentiometer outputs, resistance bulbs whose resistance indicate the ambient temperature to which they are exposed and other similar devices. Although only three sensors are shown in each of FIGS. 1 and 2, it is to be understood that the system may be extended to any number of sensors. Potentiometers 6, 7 and 8 are mechanically coupled to sensor inputs 1, 2 and 3 for transmitting the magnitude of the parameters which are being sensed. The parameters being measured are determined by the position of the wipers of potentiometers 6, 7 and 8. Thus, the electrical outputs of potentiometers 6, 7 and 8 reveal or indicate the amplitude of the parameters which are being sensed by inputs 1, 2 and 3. The wipers of potentiometers 6, 7 and 8 are respectively connected electrically to the base electrodes of transistors 9, 10 and 11. Alternating current source 4 and direct current source 5 are serially connected to a parallel arrangement of the potentiometers 6, 7, 8 and 18, as shown in FIG. 1. Direct current source 5 is used to insure that only one of the transistors 9, 10, and 11 will always remain conductive. The transistors act as electrical channels for conducting the appropriate signal to the selected indicating and identifying means 31, 32, 33 energized by transistor selected relays 21, 22, and 23. Resistor 12A maintains the transistor current at a safe and reasonable level. The transistors 9, 10, and 11 are shown connected in such a manner that only one transistor can be in a conducting mode for a given set of input conditions. The transistor which is in the conducting mode due to the direct current signal from source 5 thereupon transmits the second or alternating current signal from source 4 with no attenuation. It can be shown that the alternating current of the source 4 at the output point 14A is equal to the maximum of the input signals. This signal may then be measured and displayed on indicator 19 by any one of several conventional means. In FIG. 1, transistor 11 is shown as the active transistor. Transistor 11 causes direct current to flow from its collector electrode through the relay 21, which causes each of relay contacts 21A and 21B to close. Contact 21B causes light of identifying means 31 to be illuminated thereby indicating that sensor input 1 is being transmitted and displayed on indicator 19. Contact 21A gives closed circuit transmission of the potentiometer output to the bridge network 15, amplifier 16, motor 17, and indicator 19. Contacts 23A and 23B of relay 23 perform similar functions when transistor 9 is the only one activated. Contacts 22A and 22B of relay 22 perform similar functions when solely activated by transistor 10. Illumination from each of light sources of identifying means 32 and 33 also indicate in a similar manner the transmission of the signal from sensor inputs 2 and 3.

The highest alternating and direct current signals which correspond to the highest amplitude of input signals exists at point 14A. Capacitor 14 blocks the direct current while allowing the alternating current to pass through unattenuated. The alternating current at point 14B is a measure of the signal that exists on the wiper of potentiometer 18 connected by means of network 15. The difference is fed from the bridge network to amplifier 16, the output of which is used to drive motor 17. Potentiometer 18 is mechanically coupled to the output shaft of motor 17. The motor control servo system is so connected as to drive itself to a null. At null, the angular position of the wiper of potentiometer 18 is proportional to the magnitude of the maximum signal input. The angular position of potentiometer 18 is used to display the magnitude of the highest input upon indicator 19 for observation by the operator. The operator thereby reads the maximum of the input signals which are being monitored by sensor inputs 1, 2, and 3.

The bridge network 15 is a typical circuit used in the instrument field and is well-known to those skilled in the art. The indicating device described herein consists of bridge network 15, amplifier 16, motor 17, rebalance potentiometer 18, and indicator 19, and is a typical instrument mechanism and well-known to those skilled in the art. Thus, the operator is able to identify the amplitude of the signal and the source from which it is derived.

Figure 2:
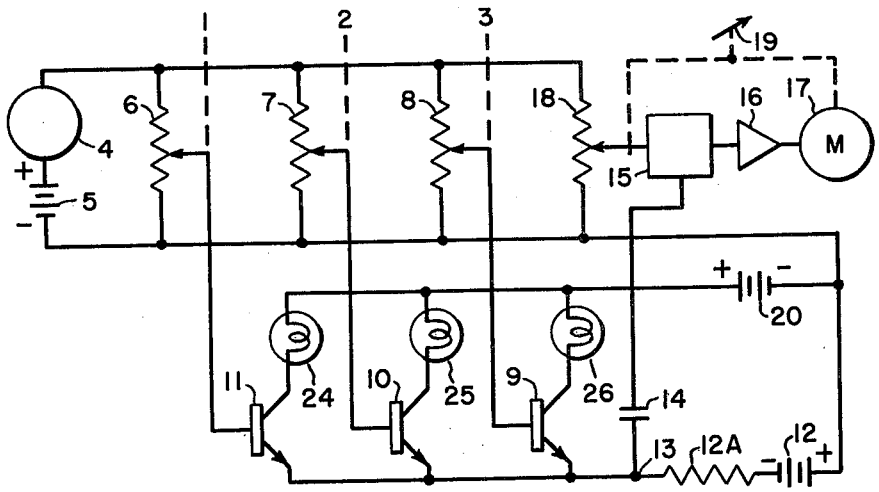
FIGURE 2 is a schematic diagram of another embodiment of a different circuit for determining and identifying the maximum of a plurality of signals in accordance with the present invention.

In reference to FIG. 2 another embodiment is shown which performs a similar function. A plurality of sensor inputs 1, 2 and 3 is shown by way of example.

In similar manner to the above description relating to FIG. 1, transistor 9 may conduct and becomes the only conducting transistor. The collector current drawn through transistor 9 illuminates light source 26, thus revealing sensor output 3 as the source which is being transmitted. The alternating voltage that exists at point 13 is substantially identical to the maximum of the plurality of inputs since the alternating current signal gain of transistors 9, 10 and 11 can be designed so as to be very nearly equal to unity. With proper circuit design techniques well-known to those skilled in the art, this small difference can be made negligible. Improved operation of the circuit can be obtained by the use of two transistors per channel to achieve superior performance and to have the alternating current signal gain more nearly equal to unity. The alternating current at point 13 is transmitted through capacitor 14 to bridge network 15 where it is compared with the voltage signal on the wiper of rebalance potentiometer 18. The difference between these two signals is fed to amplifier 16, motor 17, and indicator 19 in such a way that the system drives the rebalance potentiometer 18 to a null. At null, the position of the wiper of potentiometer 18 reveals the amplitude of the input signal. The illumination of one of the three light sources, 24, 25, and 26, reveals which one of the plurality of sensor outputs is being transmitted. The transistors 9, 10 and 11 as well as those shown in FIG. 1, are readily obtainable from any reliable transistor manufacturer.

The circuits can also be modified to perform in a similar manner and to indicate the source of and to transmit the magnitude of the lowest of a plurality of sensor outputs.

Although the specified embodiments shown have utilized a servo system for indicating the amplitude of the signal, it is to be understood that non-rebalancing indicators can be used with similarly advantageous results.

While specific embodiments of the present invention have been described, it is apparent that other modifications will occur to those skilled in the art, and it is to be understood that the specific embodiments are not presented by way of limitation, but the present invention comprehends all constructions coming within the scope of the appended claims.

I claim:

1. An electronic selection circuit comprising a series of at least two potentiometer means for individually receiving at least two input signals mechanically coupled to the adjustable tap of said potentiometer means, means connected to all of said potentiometer means for producing at a node a signal equal to the maximum signal of said individually received input signals, means for supplying both direct currents and alternating currents to said potentiometer means, means connected to said producing means for identifying the source of said input signal and means connected to said node for indicating the magnitude of said maximum input signal.

2. An electronic selection circuit according to claim 1 wherein said producing means is a transistor.

3. An electronic selection circuit according to claim 1 wherein the identifying means comprises a light source.

References Cited by the Examiner
UNITED STATES PATENTS

| | | | |
|---|---|---|---|
| 1,199,340 | 9/16 | Block | 340—182 |
| 2,614,163 | 10/52 | Roper | 340—182 |

NEIL C. READ, *Primary Examiner.*

THOMAS B. HABECKER, *Examiner.*